United States Patent
Huang (10) Patent No.: US 12,472,654 B2
(45) Date of Patent: Nov. 18, 2025

(54) TUBE CUTTER FOR TUBES WITH VARIOUS DIAMETERS

(71) Applicant: YUNG CHI INDUSTRY CO., LTD., Taichung (TW)

(72) Inventor: Wu Sheng Huang, Taichung (TW)

(73) Assignee: YUNG CHI INDUSTRY CO., LTD., Taichung (TW)

(*) Notice: Subject to any disclaimer, the term of this patent is extended or adjusted under 35 U.S.C. 154(b) by 136 days.

(21) Appl. No.: 18/623,524

(22) Filed: Apr. 1, 2024

(65) Prior Publication Data

US 2025/0303600 A1    Oct. 2, 2025

(51) Int. Cl.
| | | |
|---|---|---|
| *B26D 3/16* | (2006.01) | |
| *B23D 21/08* | (2006.01) | |
| *B25G 1/08* | (2006.01) | |

(52) U.S. Cl.
CPC ............. *B26D 3/169* (2013.01); *B23D 21/08* (2013.01); *B25G 1/08* (2013.01)

(58) Field of Classification Search
CPC .. B26D 3/16; B26D 3/161–168; B26D 3/169; B23D 21/06; B23D 21/08
See application file for complete search history.

(56) References Cited

U.S. PATENT DOCUMENTS

| | | | | |
|---|---|---|---|---|
| 3,335,492 A | * | 8/1967 | Spiro ..................... | B23D 21/08 30/101 |
| 4,831,732 A | * | 5/1989 | Garton ................... | B23D 21/08 30/101 |
| 5,285,576 A | * | 2/1994 | Taylor .................... | B23D 21/08 30/93 |
| 6,032,367 A | * | 3/2000 | Bonnette ................ | B23D 21/08 30/101 |
| 8,573,099 B2 | * | 11/2013 | Huang .................... | B23D 21/08 82/113 |
| 10,052,701 B2 | * | 8/2018 | Zhou ..................... | B26D 7/2621 |
| 10,059,018 B2 | * | 8/2018 | Zhou ..................... | B26D 3/169 |
| 10,118,305 B2 | * | 11/2018 | Wright .................. | B65B 69/0025 |
| 10,363,678 B2 | * | 7/2019 | Kloiber ................ | B23D 55/082 |
| 11,224,925 B2 | * | 1/2022 | Canis .................... | B23D 21/06 |
| 11,684,984 B2 | * | 6/2023 | Frenken ................ | B23D 21/00 30/92 |
| 11,701,720 B2 | * | 7/2023 | Huang ................... | B23D 21/04 30/93 |
| 12,383,967 B2 | * | 8/2025 | Huang ................... | B23D 21/08 |

(Continued)

*Primary Examiner* — Adam J Eiseman
*Assistant Examiner* — Richard D Crosby, Jr.
(74) *Attorney, Agent, or Firm* — Sinorica International Patent & Trademark (57) ABSTRACT

A tube cutter comprises a main body, a cutting member, a base and a restricting member. The main body has a cutting space and a groove. The groove includes a top opening and two side openings. The cutting member is received in the main body, having a least a portion protruding into the cutting space. The base is detachably received in the groove of the main body and switched between a first angle and a second angle. The restricting member is movably received in the main body and adjacent to one of the side openings to be turned between a first position and a second position. At least a portion of the restricting member blocks the side opening when the restricting member is turned to the first position; the restricting member leaves the side opening when the restricting member is turned to the second position.

8 Claims, 7 Drawing Sheets

(56) References Cited

U.S. PATENT DOCUMENTS

| | | | | |
|---|---|---|---|---|
| 2012/0247286 A1* | 10/2012 | Huang | ................ | B23D 21/08 82/60 |
| 2016/0008895 A1* | 1/2016 | Chen | ................ | B23D 21/08 30/102 |
| 2018/0021863 A1* | 1/2018 | Chen | ................ | B23D 21/08 30/102 |
| 2021/0060670 A1* | 3/2021 | Chen | ................ | B26D 7/04 |
| 2022/0001470 A1* | 1/2022 | Heinsohn | ............ | B23D 21/06 |

* cited by examiner

TUBE CUTTER FOR TUBES WITH VARIOUS DIAMETERS

BACKGROUND OF THE INVENTION

1. Technical Field

The present invention relates to a hand tool, and more particularly to a tube cutter for fitting tubes with various diameters.

2. Description of Related Art

In engineering operations, various types of tubes (such as copper pipes, iron pipes, PVC hoses, etc.) are often required. Typically, these tubes are manufactured in long lengths, but in practical applications, only a portion of them may be needed. In such cases, it is necessary to cut the tubes to the required length using tube cutting equipment.

The issue with the structure of the above-mentioned pipe cutter is that dimensions of the circular groove in the lower clamping part are fixed, making it suitable only for tubes of specific diameter. If an operator wishes to use the tube cutter to cut tubes that are larger or smaller than the corresponding diameter, it lead to instability in clamping due to the mismatch between the pipe diameter and the groove. This result in the tube shifting during the cutting operation, requiring more time and effort to adjust the pipe's position, leading to reduced cutting efficiency. Alternatively, it may necessitate the use of different tube cutters specifically designed for the pipe diameter, which is highly inconvenient.

BRIEF SUMMARY OF THE INVENTION

In view of the above, the primary objective of the present invention is to provide a tube cutter for cutting tubes with various diameters by using only one tube cutter, achieving a convenient tube cutting experience.

In order to achieve the objective of the present invention, a tube cutter, comprising: a main body having a cutting space and a groove; wherein the groove includes a top opening and two side openings, the top opening is communicated with the cutting space, and the side openings aren't communicated with the cutting space; a cutting member, received in the main body, having a least a portion protruding into the cutting space; a base, detachably received in the groove of the main body and switched between a first angle and a second angle, having a first slot and a second slot on opposite sides; the first slot communicated with the cutting space to clamp a tube of a first predetermined diameter when the base switched to the first angle; the second slot communicated with the cutting space to clamp a tube of a second predetermined diameter when the base switched to the second angle; and a restricting member, movably received in the main body and adjacent to one of the side openings to be turned between a first position and a second position; at least a portion of the restricting member blocked the side opening to restrict the base for insertion into or removal from the groove when the restricting member moves to the first position; the restricting member leaving the side opening to allow the base for insertion into or removal from the groove when the restricting member moves to the second position.

In an embodiment, the restricting member is a spring, having a tendency to move from the second position to the first position in normal.

In an embodiment, the restricting member comprises two fixed section and a movable section with opposite ends connected to the fixed section; a height of the movable section is higher than that of a bottom of the groove when the restricting member is turned to the first position; the height of the movable section is not higher than that of the bottom of the groove when the restricting member is turned to the second position.

In an embodiment, a portion of the movable section adjacent to the side opening extends generally parallel to the side opening and a portion of the movable section away from the side opening extends generally perpendicular to the side opening when the restricting member is turned to the first position.

In an embodiment, the main body has a storage space in its interior and a spare cutting blade received in the storage space.

In an embodiment, the main body has two side covers detachably connected to opposite sides of the main body; two spare cutting blade receiver are mounted on the inner surfaces of the side covers respectively, and the storage space is formed between the cutting blade receivers.

In an embodiment, the main body has a wall adjacent to one of the side openings of the groove relative to the restricting member; a height of the wall is higher than that of a bottom of the groove to limit the base for insertion into or removal from the adjacent side opening.

In an embodiment, the main body has a side cover detachably connected to a side of the main body, and the wall is formed on the side cover.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 1 to FIG. 4, a tube cutter of a preferred embodiment of the present invention includes a main body 10, a cutting member 20, a base 30, and a restricting member 40.

The main body 10 is a C-shape circular case, having a cutting space 11 and a groove 12. The cutting space 11 is configured to receive a tube. The groove 12 is located beneath the cutting space 11, and is corresponded to the base 30 to receive the base 30. The groove 12 has a top opening 120 and two side openings 121,122. The top opening 120 is above the groove 12, allowing the groove 12 to communicate with the cutting space 11. The side openings 121,122 are located on opposite sides of the main body 10, and not communicated with the cutting space 11.

The main body 10 has a blade receiving space 13 located above the cutting space 11 to receive at least a portion of the cutting member 20. The blade receiving space 13 has a rail 130. The main body 10 further has two side covers 14 detachably connected to opposite sides of the main body 10 to cover the blade receiving space 13.

In the present preferred embodiment, the main body 10 has a storage space 15 in its interior and receiving a spare cutting blade 50. In particular, each of the side covers 14 has a spare cutting blade receiver 140 in its inner wall, the spare cutting blade receivers 140 can be combined to form the storage space 15 corresponded to the spare cutting blade 50.

The side cover 14 adjacent to the side opening 122 has a wall 141. A height of the wall 141 is higher than that of a bottom of the groove 12, so that the base 30 is unable to enter/leave the groove 12 through the side opening 122.

The cutting member 20 includes a cutting blade 21, a shaft 22 and a plurality of elastic members 23. The cutting blade 21 is received in the main body 10 with at least a portion protruding into the cutting space 11 to cut the tube in the cutting space 11. The shaft 22 passes through the center of the cutting blade 21, allowing the cutting blade 21 to rotate relative to the shaft 22. Opposite ends of the shaft 22 are engaged with the rail 130. The elastic members 23 are engaged with the cutting blade 21 and the shaft 22 respectively to provide preloads from various directions biasing the cutting member 20 to move toward a front end of the rail 130 when cutting the tube.

The base 30 is detachably received in the groove 12 of the main body 10, and is able to be switched between a first angle and a second angle. The base 30 has a first slot 31 and a second slot 32 located on opposite ends of the base 30 respectively. A width and a depth of the first slot 31 are larger than that of the second slot 32. The first slot 31 is toward to the cutting space 11 when the base 30 is switched to the first angle; while the second slot 32 is toward to the cutting space 11 when the base 30 is switched to the second angle, so that the tube cutter is able to receive tubes in various diameters by switching the base 30. In an alternative preferred embodiment, two roller members with different sizes can be mounted on the base instead of the slots.

The base 30 further includes a first interface 33 and a second interface 34. The first interface 33 is connected to the first slot 31, and the second interface 34 is connected to the second slot 32. When the base 30 is received in the main body 10 in the first angle, the first interface 33 engages the main body 10. When the base 30 is received in the main body 10 in the second angle, the second interface 34 engages the main body 10.

The restricting member 40 is movably mounted on the main body 10 and can be driven to be turned between a first position and a second position. The restricting member 40 moves toward to the side opening 121 and blocks the side opening 121 to restrict the base 30 leaving the main body 10 from the side opening 121 when the restricting member 40 is turned to the first position. The restricting member 40 moves backward to the side opening 121 so that the base 30 is allowed to leave the main body 10 through the side opening 121 when the restricting member 40 is turned to the second position. In the present preferred embodiment, the restricting member 40 is a spring having two fixed sections 41 and a movable section 42. The fixed sections 41 are separated by a predetermined distance and fixed on the main body 10. The movable section 42 is located between the fixed sections 41, with two ends connected to the fixed sections 41 respectively, and extend from the main body 10. The movable section 42 is generally U-shaped. When the restricting member 40 is located at the first position, a portion of the movable section 42 adjacent to the side opening 121 extends generally parallel to the side opening 121, and a portion of the movable section 42 away from the side opening 121 extends generally perpendicular to the side opening 121. When the restricting member 40 is turned to the first position, a height of the movable section 42 is higher than that of the bottom of the groove 12, blocking the side opening 121 so that the side opening 121 is switched to a closed state. When the restricting member 40 is turned to the second position, the height of the movable section 42 is not higher than the bottom of the groove 12, so that the side opening 121 is switched to an opened state. Since the restricting member 40 is a spring, the restricting member 40 produces a tendency to move from the second position toward the first position.

Figure 1:
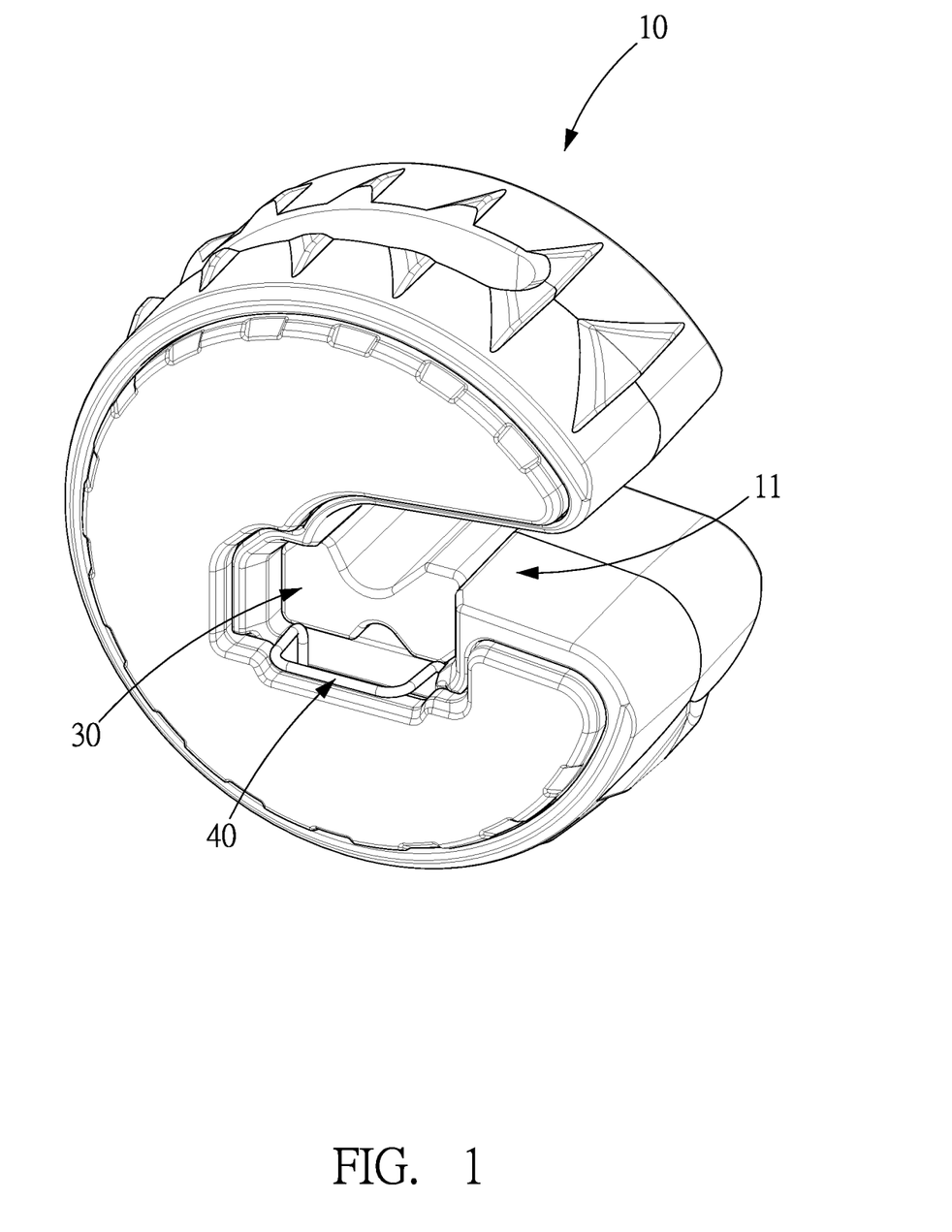
FIG. 1 is a perspective view of a preferred embodiment of the present invention.
Figure 2:
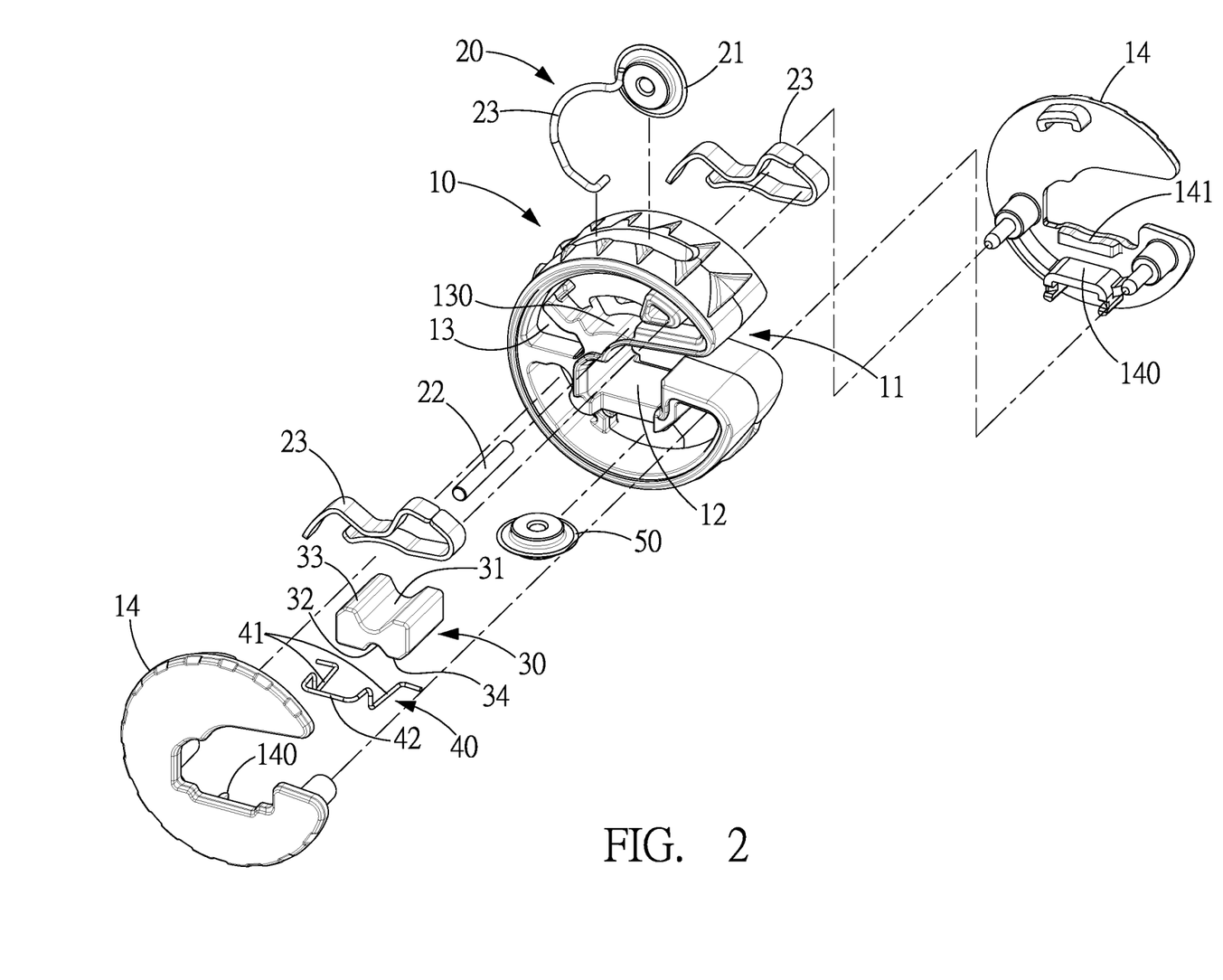
FIG. 2 is an exploded view of the preferred embodiment of the present invention.
Figure 3:
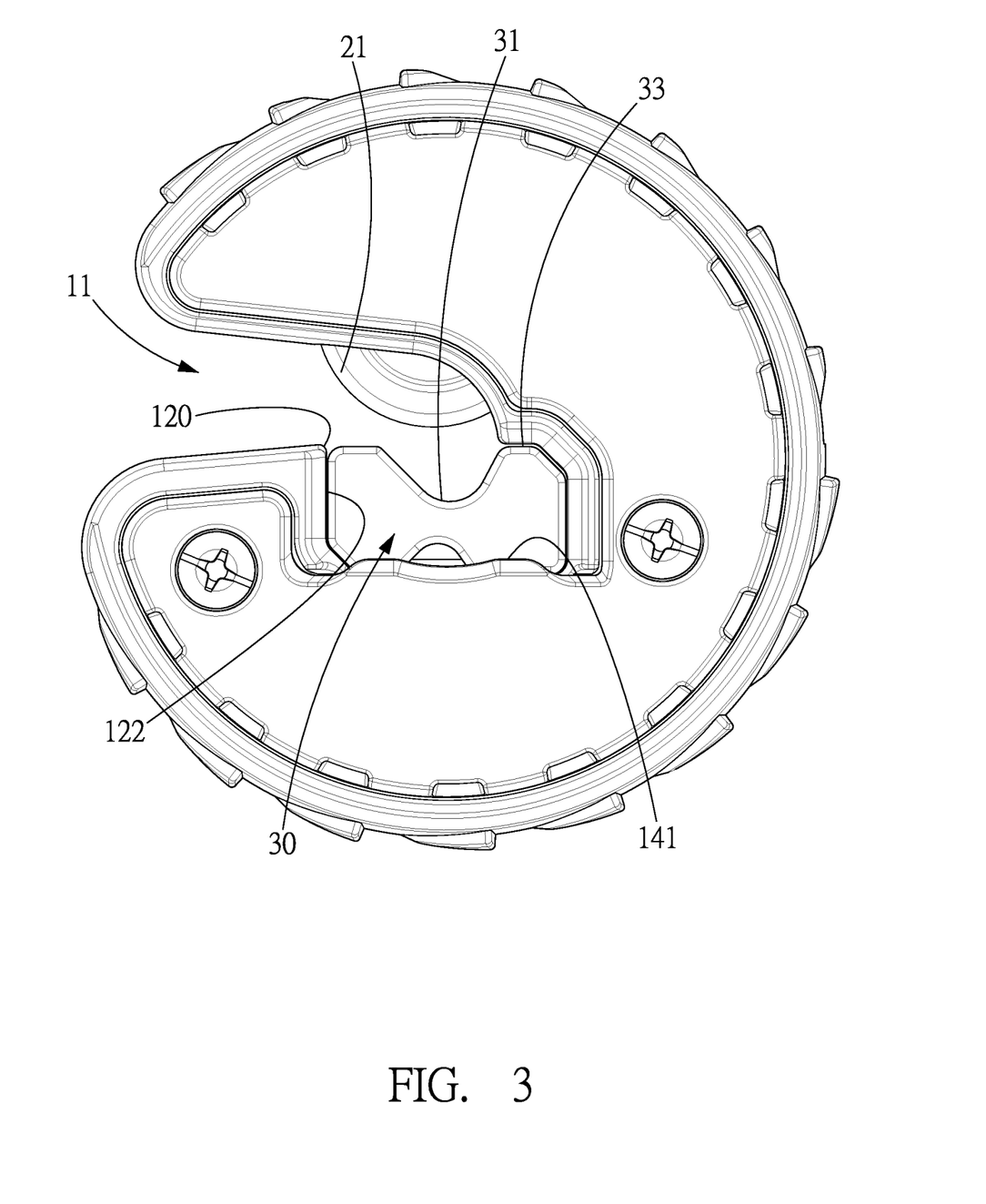
FIG. 3 is a rear view of the preferred embodiment of the present invention.
Figure 4:
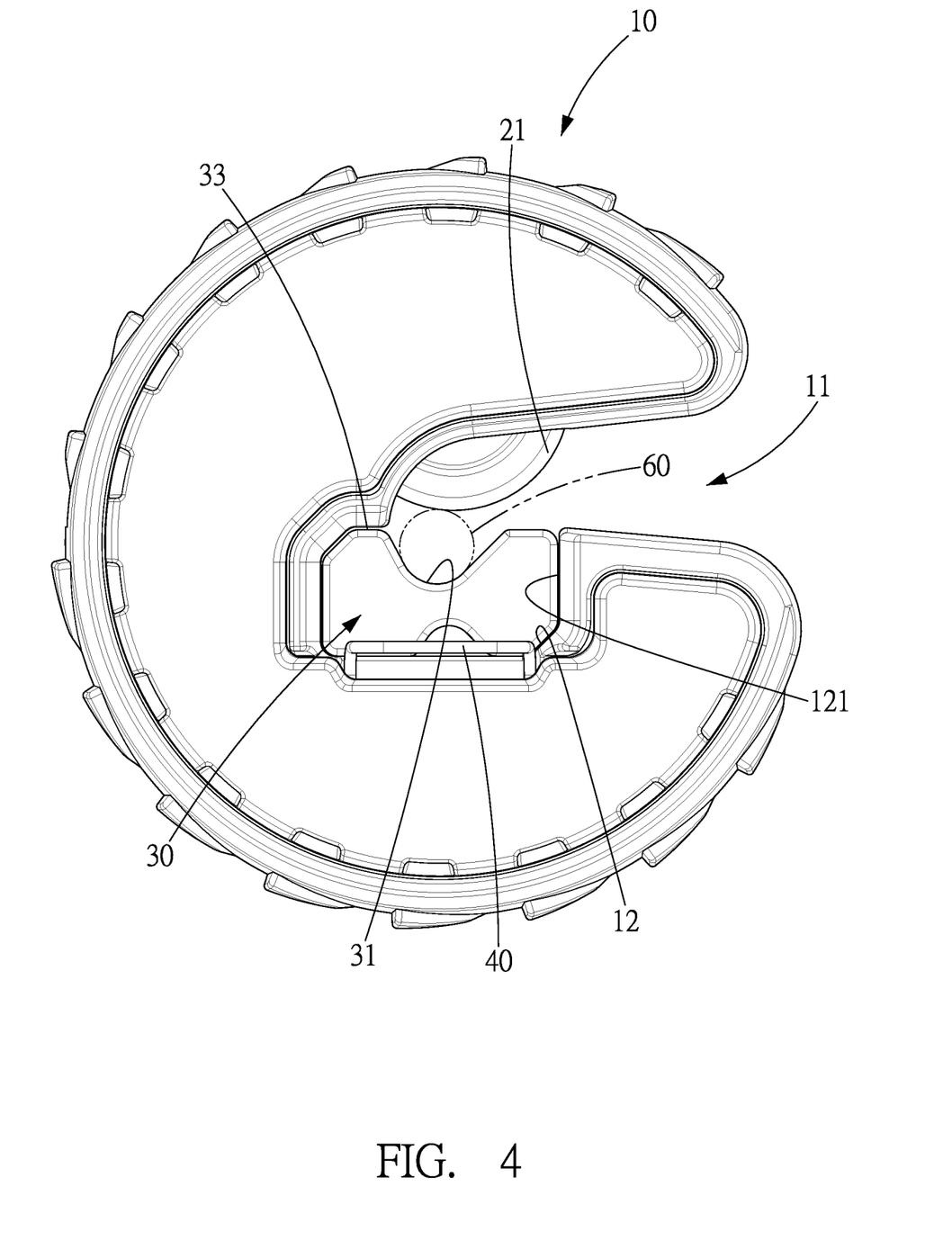
FIG. 4 is a schematic view of the preferred embodiment of the present invention, showing the tube cutting operation in the first angle.
Figure 5:
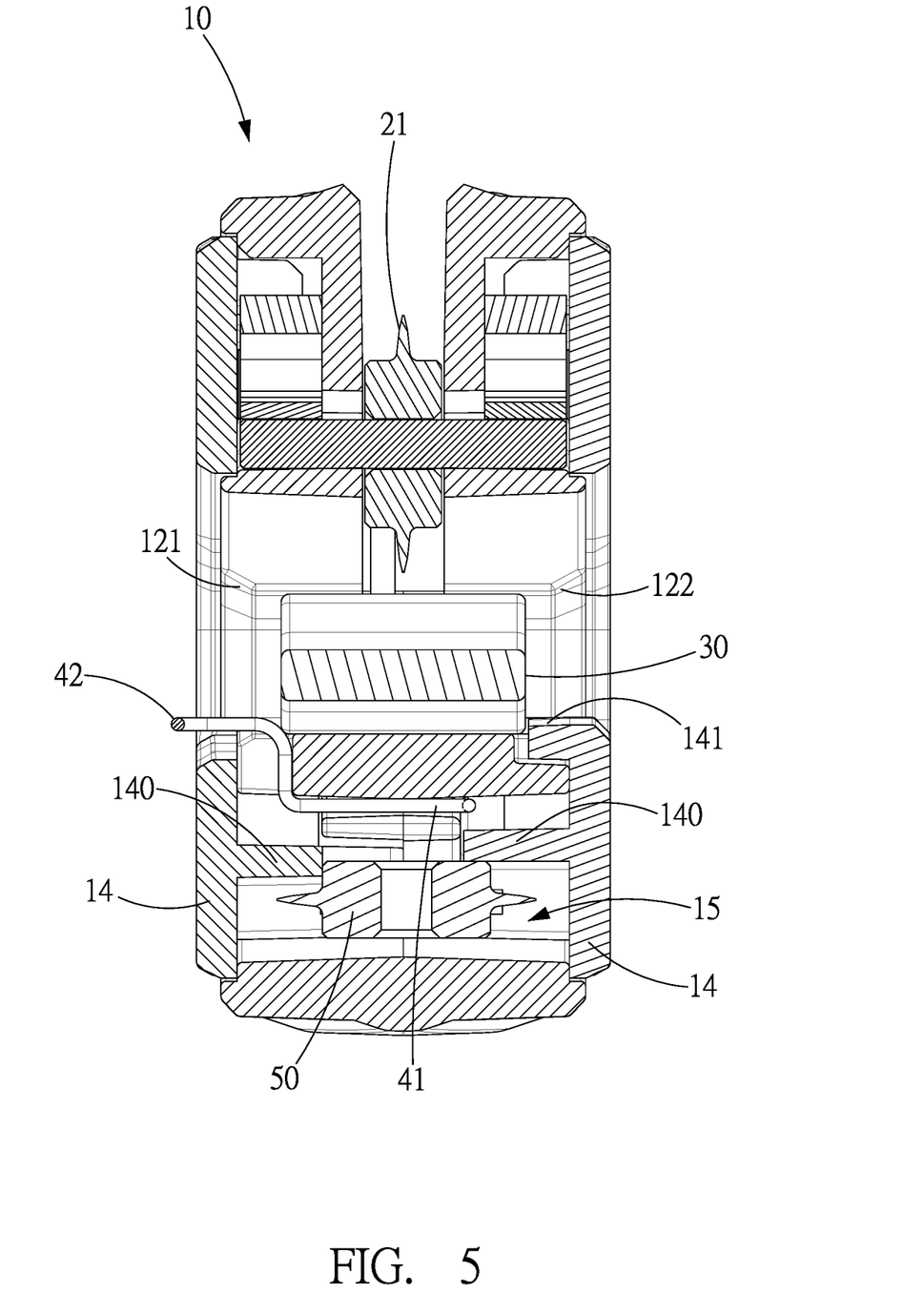
FIG. 5 is a schematic view of the preferred embodiment of the present invention, showing the restricting member in the first position.

As shown in FIG. 4 to FIG. 5, The base 30 of the preferred embodiment of the present invention is able to be switched between different angles by a subject to receive tubes of various diameters. For example, the subject may switch the base 30 into the first angle and insert the base 30 into the groove 12 from the side openings 121. In this situation, the first slot 31 is communicated with the cutting space 11 and corresponded to the cutting blade 21. Thereby a tube 60 of a first predetermined diameter is able to be inserted into the cutting space 11 and clamped by the first slot 31 and the cutting blade 21 for cutting operation. Since one of the first interface 33 and the second interface 34 of the base 30 engages the inner edge of the main body 10, the base 30 cannot move from the top opening 120 of the groove 12. In addition, since the side openings 122 of the main body 10 is blocked by the wall 141, and the side opening 121 is blocked by the restricting member 40 at the first position, the base 30 cannot be removed from the main body 10 through the side openings 121,122 of the groove 12. Therefore, the base 30 and the main body 10 can be regarded as fixed state in first angle.

Figure 6:
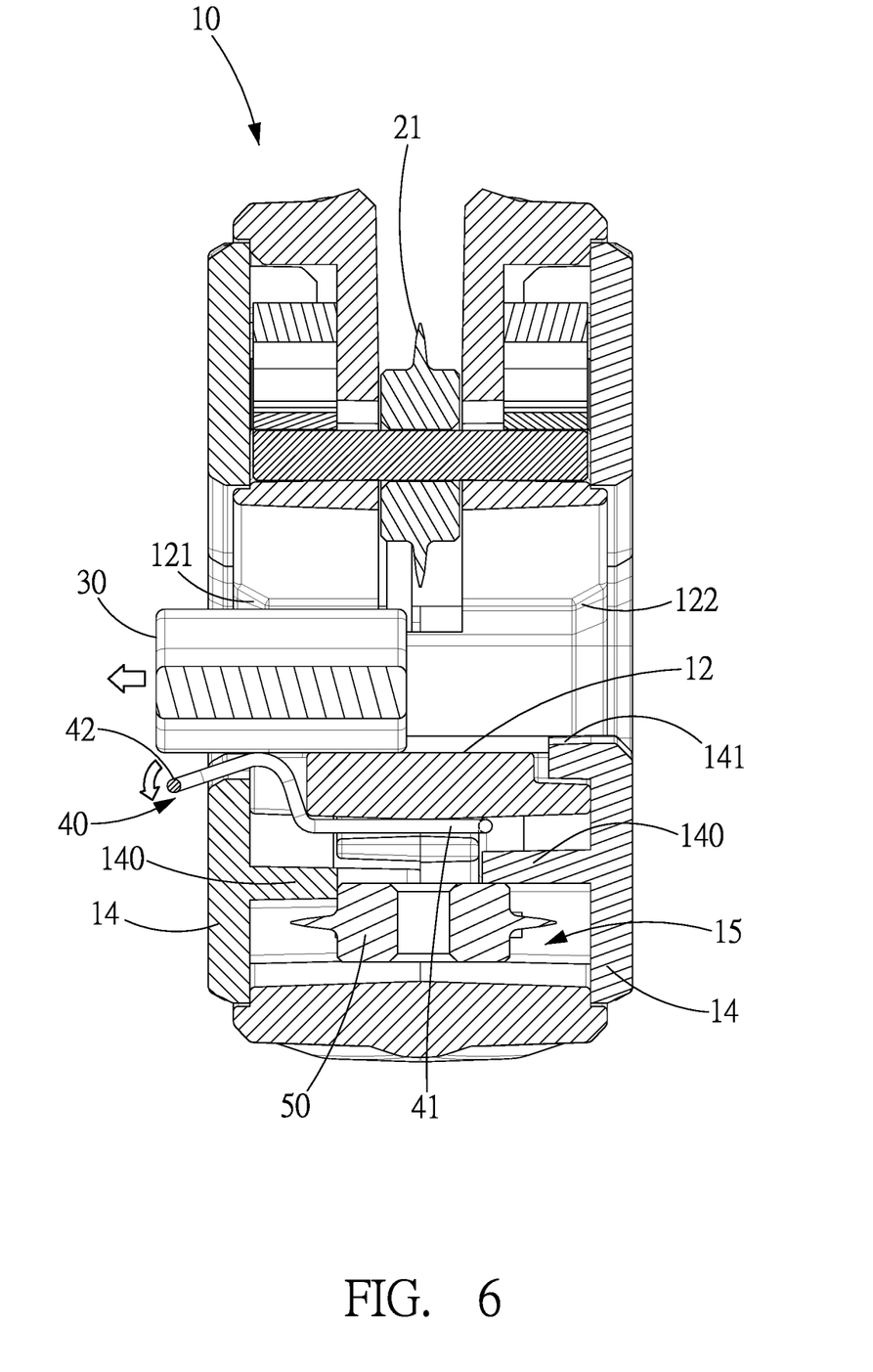
FIG. 6 is a schematic view of the preferred embodiment of the present invention, showing the restricting member moving to the second position.
Figure 7:
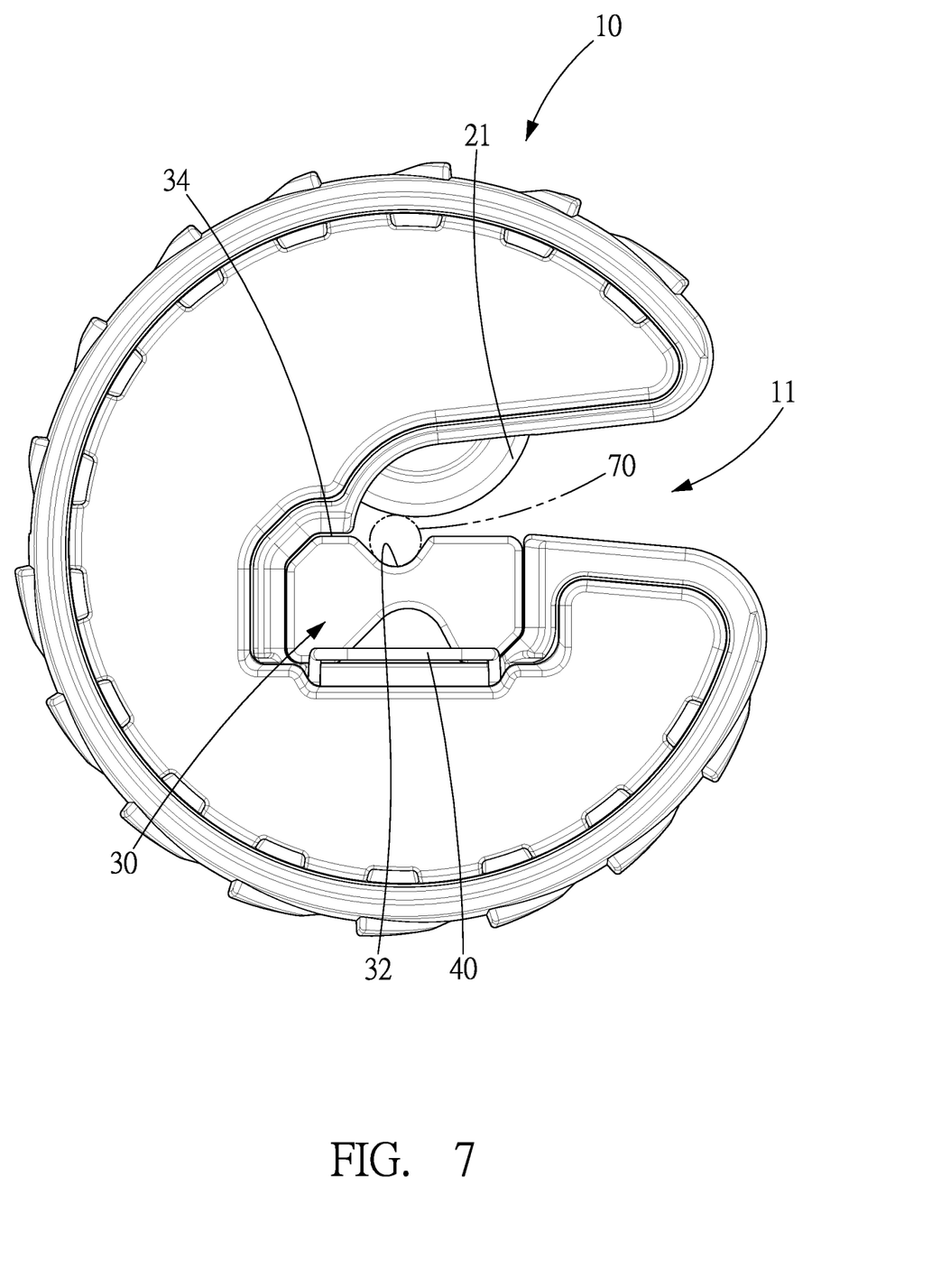
FIG. 7 is a schematic view of the preferred embodiment of the present invention, showing the tube cutting operation in the second angle.

As shown in FIG. 6 to FIG. 7, when the subject wants to cut tubes in the second angle, the subject may hold the movable section 42 of the restricting member 40 with hands or tools, and pull it downward to move the restricting member 40 from the first position to the second position. Since the height of the movable section 42 of the restricting member 40 in the second position is not higher than the bottom of the groove 12, the side opening 121 is changed into the open state, and the subject may apply force on The base 30 to remove the base 30 from the main body through the side opening 121. Next, the subject may rotates the base 30 to the second angle and then placed into the groove 12 through the side opening 121, then releases the restricting member 40. The restricting member 40 will automatically return from the second position to the first position under elastic force, and fix the base 30 to the main body 10 again. In this situation, the second slot 32 is communicated with the cutting space 11 and corresponded to the cutting blade 21. Thereby a tube 70 of a second predetermined diameter is able to be inserted into the cutting space 11 and clamped by the second slot 32 and the cutting blade 21 for cutting operation. Due to the different width and depth of the first slot 31 and the second slot 32, the tube cutter of the preferred embodiment of the present invention is able to cut tubes with different diameters by switching the base 30. It should be noted that in the present preferred embodiment, the first angle is 0 degree and the second angle is 180 degree. In an alternative preferred embodiment, the first angle and the second angle can be any different angle.

In conclusion, the tube cutter of the present invention may achieve the goal of cutting tubes of various dimensions with the same pipe cutter by switching the base to different angles. Also the structure of the restricting member can effectively restrict the base to the main body in the first position, and may be moved to the second position to pull out the base and change the installation angle of the base. On the other hand, the present invention also provides a storage space for storing spare cutting blades, effectively solving the problem of being unable to use the cutter due to blade damage during the cutting operation. Compared to conventional tube cutters, the present invention is able to provide a convenient and safe tube cutting experience.

It must be pointed out that the embodiments described above are only some preferred embodiments of the present invention. All equivalent structures which employ the concepts disclosed in this specification and the appended claims should fall within the scope of the present invention.

What is claimed is:

1. A tube cutter, comprising:
   a main body having a cutting space and a groove; wherein the groove includes a top opening and two side openings, the top opening is communicated with the cutting space, and the side openings aren't communicated with the cutting space;
   a cutting member, received in the main body, having a least a portion protruding into the cutting space;
   a base, detachably received in the groove of the main body and switched between a first angle and a second angle, having a first slot and a second slot on opposite sides; the first slot communicated with the cutting space to clamp a tube of a first predetermined diameter when the base switched to the first angle; the second slot communicated with the cutting space to clamp a tube of a second predetermined diameter when the base switched to the second angle; and
   a restricting member movably received in the main body and adjacent to one of the side openings to be turned between a first position and a second position; at least a portion of the restricting member blocked the side opening to restrict the base for insertion into or removal from the groove when the restricting member moves to the first position; the restricting member leaving the side opening to allow the base for insertion into or removal from the groove when the restricting member moves to the second position.

2. The tube cutter of claim 1, wherein the restricting member is a spring, having a tendency to move from the second position to the first position in normal.

3. The tube cutter of claim 1, wherein the restricting member comprises two fixed section and a movable section with opposite ends connected to the fixed section; a height of the movable section is higher than that of a bottom of the groove when the restricting member is turned to the first position; the height of the movable section is not higher than that of the bottom of the groove when the restricting member is turned to the second position.

4. The tube cutter of claim 3, wherein a portion of the movable section adjacent to the side opening extends generally parallel to the side opening and a portion of the movable section away from the side opening extends generally perpendicular to the side opening when the restricting member is turned to the first position.

5. The tube cutter of claim 1, wherein the main body has a storage space in its interior and a spare cutting blade received in the storage space.

6. The tube cutter of claim 5, wherein the main body has two side covers detachably connected to opposite sides of the main body; two spare cutting blade receiver are mounted on the inner surfaces of the side covers respectively, and the storage space is formed between the cutting blade receivers.

7. The tube cutter of claim 1, wherein the main body has a wall adjacent to one of the side openings of the groove relative to the restricting member; a height of the wall is higher than that of a bottom of the groove to limit the base for insertion into or removal from the adjacent side opening.

8. The tube cutter of claim 7, wherein the main body has a side cover detachably connected to a side of the main body, and the wall is formed on the side cover.

* * * * *